Feb. 11, 1969    J. F. DONNELLY ET AL    3,427,138
PROCESS CONTROL SYSTEM FOR MAKING BUTYL RUBBER
Filed Oct. 7, 1963    Sheet 3 of 3

INVENTORS.
JOHN F. DONNELLY,
MICHAEL J. LARSEN,
WILLIAM O. WEBBER,

Frank S. Troidl
ATTORNEY.

United States Patent Office 3,427,138
Patented Feb. 11, 1969

3,427,138
PROCESS CONTROL SYSTEM FOR MAKING BUTYL RUBBER
John F. Donnelly, Michael J. Larsen, and William O. Webber, Baytown, Tex., assignors, by mesne assignments, to Esso Research and Engineering Company, a corporation of Delaware
Filed Oct. 7, 1963, Ser. No. 314,219
U.S. Cl. 23—260                                   1 Claim
Int. Cl. B01j 1/00; C08f 1/72

ABSTRACT OF THE DISCLOSURE

In a system for making butyl rubber, the rate of flow of catalyst to the reactor in which the butyl rubber is produced is adjusted by a variable pneumatic control signal which is variably responsive to variations in output signals from the hydrocarbon off gases and the temperature in the reactor; a preselected viscosity of the butyl rubber may also be used for producing a pneumatic output signal which is added to the signals employed in controlling catalyst flow rate.

---

This invention relates to systems for controlling physical and chemical characteristics of products produced by reacting feed materials using a catalyst.

Briefly described, the new system includes means for feeding materials to a reactor where the materials are reacted to produce a desired product. A catalyst is also fed to the reactor. The system also includes means for determining the percentage of unreacted materials in the reactor, means for determining the temperature of the reaction, and a computer adapted to adjust the rate of flow of catalyst to the reactor when input data to the computer indicates that a characteristic of the product has fallen outside of a predetermined characteristic range. The system adjusts the rate of flow of the catalyst to the reactor varies from a predetermined value. When the other a predetermined amount and/or the temperature in the reactor varies from a predetermined value. When the other conditions are equal, the unreacted materials become a measure of catalytic activity.

This invention also includes a novel process for making butyl rubber. Briefly, a mixture of isobutene and isoprene is fed to the reactor. A diluent and a catalyst are also fed to the reactor. The resulting polymer along with unreacted hydrocarbons and diluent is fed to a flash tank where the hydrocarbons and diluent are vaporized. The percentage of hydrocarbons in the vaporized hydrocarbons and diluent is measured with a thermal conductivity analyzer. The reaction temperature in the reactor is also continuously indicated. In addition, the viscosity of a sample of the polymer is periodically measured. The rate of flow of the catalyst to the reactor is adjusted whenever one or more of the following occur:

(1) The percentage of hydrocarbons in the vaporized hydrocarbons and diluent varies from a predetermined value;

(2) The reaction temperature varies from a predetermined temperature;

(3) The viscosity of the polymer sample varies from a predetermined viscosity range.

The invention, as well as its many advantages, may be further understood by reference to the following detailed description and drawings in which.

Figure 1:
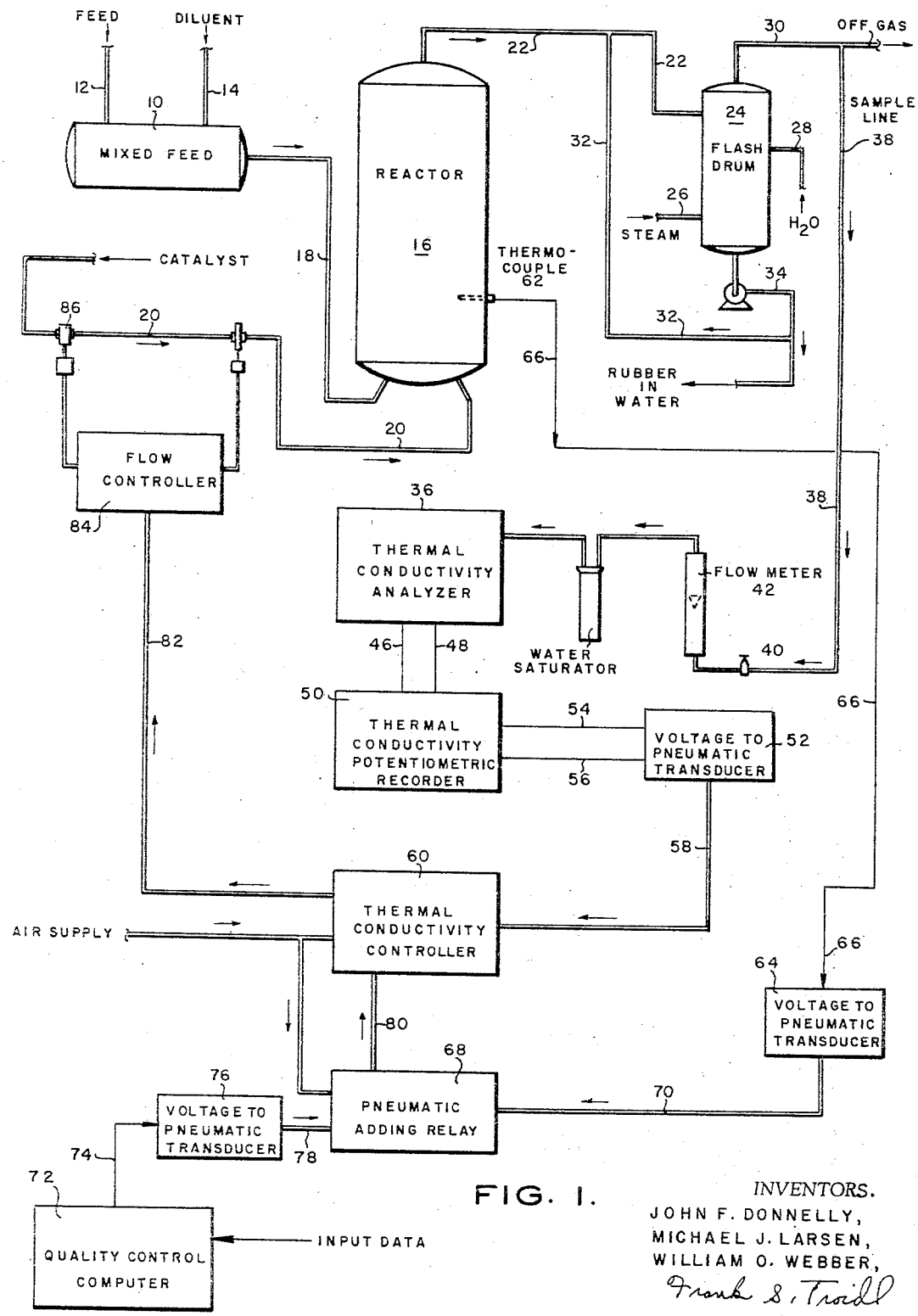
FIG. 1 is a process flow diagram of a preferred method of carrying out this invention with the electrical systems and pneumatic systems shown in block diagram.

Referring to FIG. 1, the invention is described in relation to its application to the formation of butyl rubber. The production of butyl rubber involves the copolymerization of isobutene with isoprene at a temperature of approximately —140° F. in the presence of a catalytic amount of aluminum chloride dissolved in methyl chloride and a relatively large quantity of methyl chloride which is used as a diluent.

The material to be copolymerized is fed to the mixed feed drum 10 by means of the feed line 12. The material fed through line 12 includes purified isobutene and isoprene in controlled quantities. The methyl chloride used as a diluent is fed to the mixed feed drum 10 through line 14.

The total mixed feed at a temperature of approximately —140° F. is introduced into the bottom of the reactor 16 by means of line 18. The catalyst which is prepared by dissolving solid aluminum chloride in purified methyl chloride in controlled quantities and under controlled conditions is fed through line 20 into the bottom of the reactor 16. The polymer produced in the reactor 16 along with unreacted hydrocarbons and methyl chloride diluent is discharged from the top of the reactor through line 22 into a flash tank 24.

Steam is flowed into the flash tank 24 adjacent the bottom thereof by means of line 26. Water is also added to flash tank 24 through line 28. In the flash tank 24, water, hydrocarbons, and methyl chloride are vaporized; and the rubber remains as a slurry in water. The vaporized hydrocarbons and methyl chloride and water vapor are removed from the flash tank 24 through line 30. A large volume of slurry is also returned through line 32 to the reactor outlet line 22 to promote immediate and complete vaporization of methyl chloride and hydrocarbons in flash tank 24. The slurry of rubber in water is subsequently pumped through line 34, through a stripper (not shown), and then to the finishing operations (not shown).

The physical and chemical properties of the rubber product, such as its molecular weight, are dependent upon a large number of factors, such as the concentrations of reactants and catalyst, temperature, extent of conversion, and the nature and concentration of impurities present. Mooney viscosity is employed as an approximate index of molecular weight. The Mooney viscosity may be determined by measuring the torque required to revolve a rotor at constant speed in a sample of the polymer at constant temperature. Thus, a Mooney viscosity of say 70 means a dial reading (torque) of 70 read after eight minutes' operation of the large rotor of a Mooney viscometer at 212° F.

The molecular weight of the polymer also depends on the temperature maintained during synthesis; it increases as the temperature is lowered.

The degree of unsaturation in the polymer depends on the ratio of isobutene to isoprene in the feed. Because of a difference in the reaction rate of the two monomers, isoprene being the slower of the two, the conversion level obtained in the reactor affects both the unsaturation and the molecular weight of the polymer produced from a given feed. The formation gases in line 30 have essentially the same composition as the reactor liquid product on a dry, rubber-free basis.

This invention continuously monitors the percentage of hydrocarbons in the formation gases coming from line 30 and the reaction temperature in reactor 16. In addition, a periodic measurement of the viscosity of the product is made. The rate of flow of the catalyst to the reactor 16 is adjusted if one or more of these variables varies from a predetermined value.

As shown in FIG. 1, a thermal conductivity analyzer 36 is used to measure the percentage of hydrocarbons in the flash gas from the flash tank 24. The sample to the thermal conductivity analyzer 36 is taken from the flash gas line 30 through sample line 38 to the flow regulating valve 40. The sample flows from the flow regulating valve to the flowmeter 42 and from there to the water saturator 44. The water saturator 44 is a sealed container containing water, and the sample is bubbled through the water. The saturator 44 keeps the sample at a constant water composition. From the saturator 44, the sample flows into the thermal conductivity analyzer 36.

The thermal conductivity analyzer 36 is connected by means of electrical lines 46 and 48 to the thermal conductivity potentiometric recorder 50. The thermal conductivity potentiometric recorder 50 is, in turn, connected to the voltage-to-pneumatic transducer 52 by means of electrical lines 54 and 56. The voltage-to-pneumatic transducer 52 feeds a pneumatic signal through pneumatic line 58 to a thermal conductivity controller 60.

The reaction temperature within reactor 16 is measured by a temperature measuring thermocouple 62 which feeds an electrical signal proportional to the reaction temperature to the voltage-to-pneumatic transducer 64 by means of electrical line 66. The voltage-to-pneumatic transducer 64 converts the electrical signal into a pneumatic signal and feeds the pneumatic signal through pneumatic line 70 to the pneumatic adding relay 68. The pneumatic adding relay 68 may be adjusted to produce a weighted addition output; namely, $$\text{Output} = w_1 M_{\text{thermal condition}} + w_2 M_{\text{temperature}}$$

where $$w_1 + w_2 = 1$$

The input data which indicates the viscosity of the product is fed to the quality control computer 72. The quality control computer 72 feeds an electrical signal through electrical line 74 to the voltage-to-pneumatic transducer 76 when the viscosity of the product falls outside of a predetermined viscosity range. The voltage-to-pneumatic transducer 76 converts the electrical signal from quality control computer 72 into a corresponding pneumatic signal which is fed to pneumatic adding relay 68 by means of pneumatic line 78.

The pneumatic adding relay 68 combines any signals received from pneumatic line 70 and pneumatic line 78 and feeds the sum of these combined signals to the thermal conductivity controller 60 by way of pneumatic line 80.

The thermal conductivity controller 60 feeds a pneumatic signal through pneumatic line 82 to a flow controller 84 in response to signals received from pneumatic line 48 and/or pneumatic line 80. The flow controller 84, in turn, controls the flow of catalyst through line 20 by controlling the valve 86.

Figure 2:
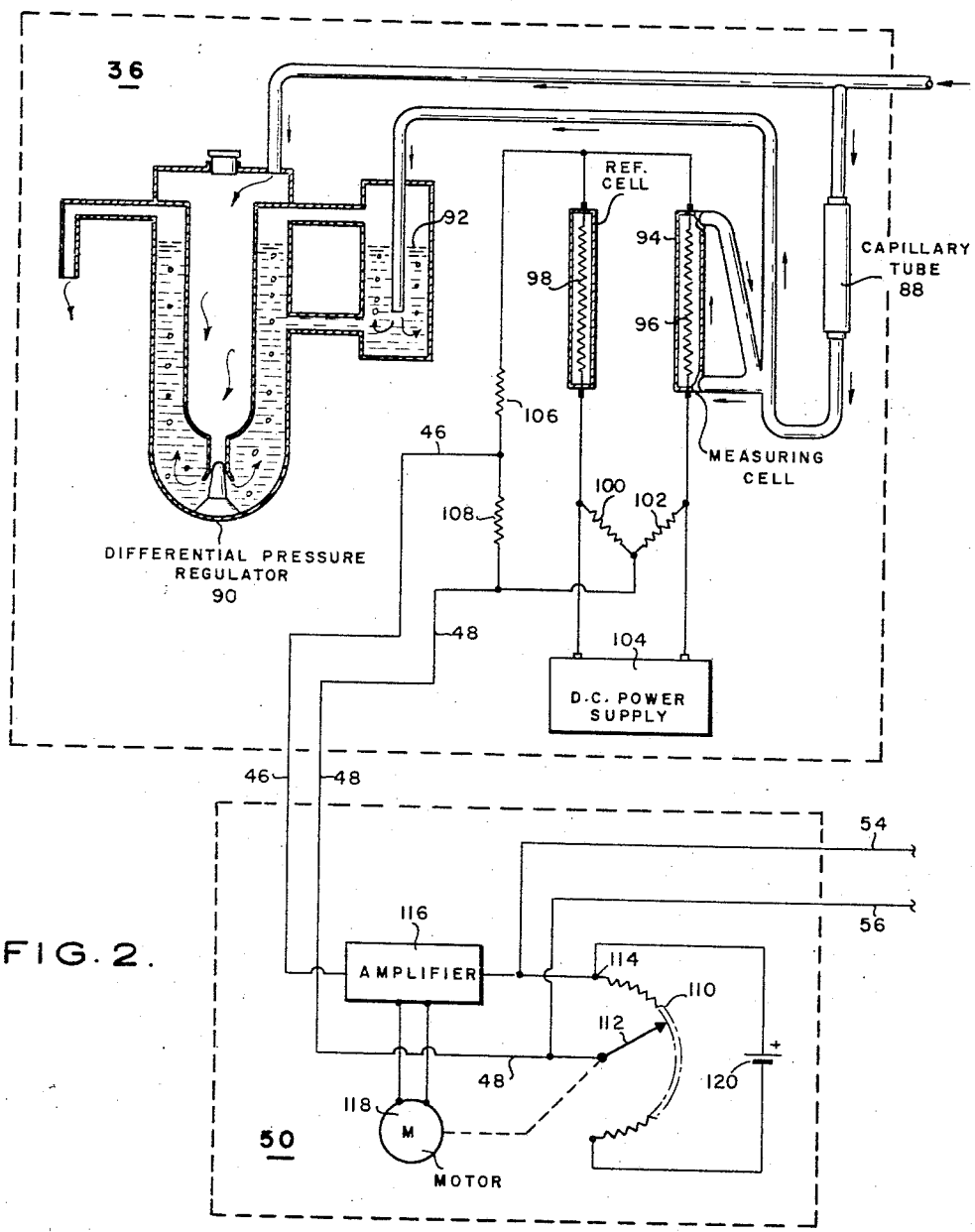
FIG. 2 is a schematic view showing the internal construction of the thermal conductivity analyzer and the thermal conductivity potentiometric recorder of FIG. 1.

FIG. 2 shows in more detail the internal construction of the thermal conductivity analyzer 36 and the thermal conductivity potentiometric recorder 50. The thermal conductivity analyzer is in a temperature-controlled container. After entering the thermal conductivity analyzer, the sample splits into two parts. Part of the sample flows through the capillary tube 88, and the remainder goes to the differential pressure regulator 90. The purpose of the differential pressure regulator is to hold a constant differential pressure by holding a constant head of liquid at 92 where the flow through the capillary enters the flow regulator. By keeping this pressure constant, the flow through the capillary tube 88 is held constant.

Part of the flow through the capillary tube 88 also flows through the measuring cell 94. The measuring cell consists of a tube which has a wire 96 suspended in the middle of it. This wire passes through the tube at each end of the tube and is sealed at these points. The wire is normally heated by an electric current passing through it, and part of this heat is removed by the gas which passes over it. Convection causes part of the sample to flow through the cell. The amount of heat removed varies with the thermal conductivity of gas which passes over it. The amount of heat removed determines the temperature of the wire. The more heat that is removed, the cooler the wire and vice versa. The electrical resistance of the wire is a direct function of its temperature. Therefore, the resistance of the wire is also a function of the thermal conductivity of the gas which determines the temperature of the wire. A measurement of this resistance can be, therefore, correlated with a measurement of the thermal conductivity of the gas. The measurement of this resistance is obtained using a Wheatstone bridge arrangement with a servo-balancing potentiometric recorder.

The Wheatstone bridge consists of the measuring cell resistance wire 96, a reference cell resistance wire 98, and fixed resistors 100 and 102. The reference cell consists of a sealed cell similar to the measuring cell with a gas of known composition sealed within it. The D.C. power supply 104 impresses a voltage across the bridge. When the measuring cell stream composition matches the reference cell gas composition, the resistances of the measuring cell wire 96 and reference cell wire 98 are equal. The bridge is then balanced, and there is no current flow through resistors 106 and 108. When the measuring cell gas has a different composition from the reference cell gas, the Wheatstone bridge becomes unbalanced; and there is a current flow through resistors 106 and 108. The resulting voltage across resistor 108 must exactly equal the voltage across the slide-wire contact 112 and the end of the slide-wire (point 114), or the amplifier 116 will put out a signal to the motor 118 to make the motor move the slide-wire contact 112 in a direction to make these voltages equal. The position of the slide-wire contact 112, therefore, becomes an indication of the amount of voltage across the resistor 108 which is an indication of the Wheatstone bridge unbalance; and the Wheatstone bridge unbalance is an indication of the difference in thermal conductivity of the gas in the measuring cell with respect to the gas in the reference cell.

The voltage that is impressed across the potentiometer slide-wire 110 is obtained from a constant source 120. The voltage between the slide-wire contact 112 and the end 114 of the slide-wire is proportional to the position of the slide-wire. This voltage is fed across lines 54 and 56 to the voltage-to-pneumatic transducer 52.

Figure 3:
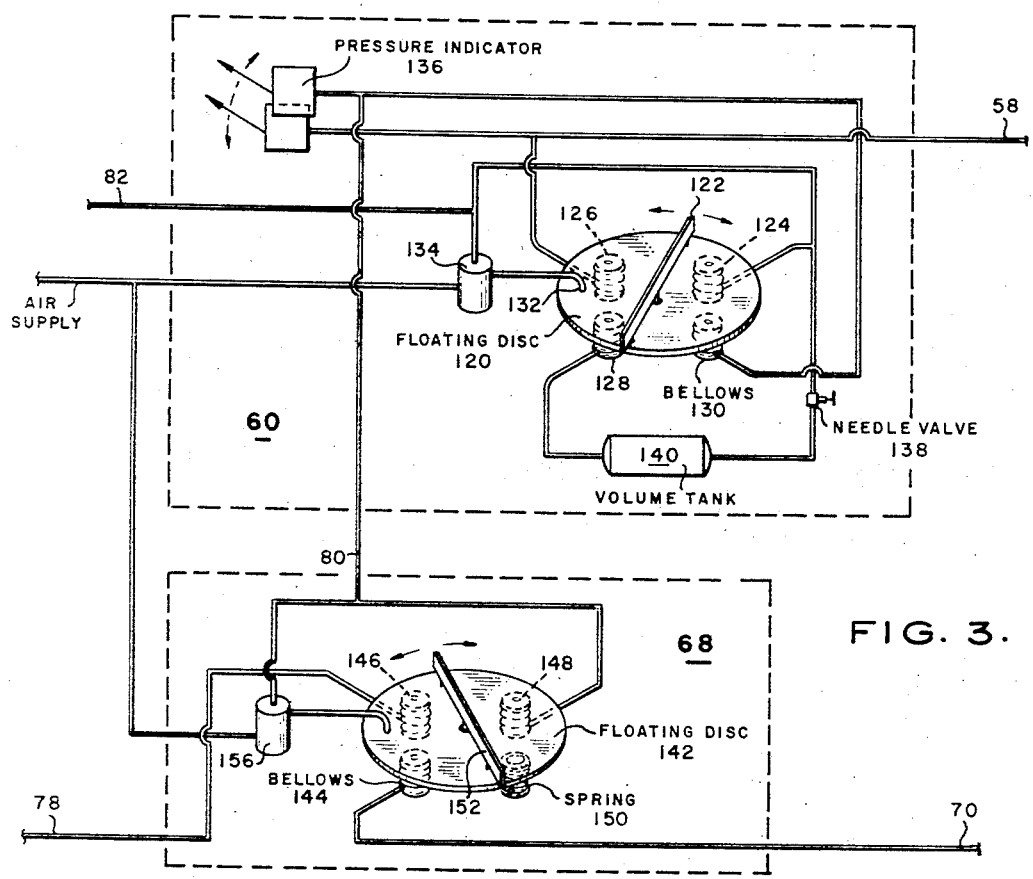
FIG. 3 is a schematic view showing the internal construction of the thermal conductivity controller and the pneumatic adding relay of FIG. 1.

The internal construction of the thermal conductivity controller 60 and the pneumatic adding relay 68 is shown in FIG. 3. The thermal conductivity controller 60 is a force-balance-type pneumatic controller. The flapper on this controller consists of a floating disc 120. The floating disc pivots around a fulcrum lever 122. The fulcrum lever is free to pivot around the center of the disc. The fulcrum lever supports the disc from the top. Supporting the disc from the bottom are four bellows 124, 126, 128, and 130. An air nozzle 132 located on top of the disc directs air on the top surface of the disc. The air nozzle is connected to a pilot relay 134 which relays the nozzle output pressure. The input signal from the transducer 52 is directed to bellows 126 and also to pressure indicator 136. The desired set pressure for the controller 60 is directed to bellows 130. The output pressure through line 82 is taken from the pilot relay 134. The output pressure from relay 134 is also directed to bellows 124 and through needle valve 138 into volume tank 140 which is connected to bellows 128.

The control action operates as follows. If there is a difference between the set pressure and the thermal conductivity input pressure, there will be an unbalance of force between bellows 126 and 130. This unbalance of force will cause the disc to pivot around the fulcrum lever 122 so that it is either further away or closer to the nozzle 132. This causes the nozzle pressure to change which, in turn, changes the output of the pilot relay and changes the force from bellows 124 in such a direction as to cause the disc to move back toward a balanced position. The output of the controller is, therefore, changed due to the difference between the thermal conductivity input pressure and the set point pressure. The changing output pressure in bellows 124 causes an air bleed through needle valve 138 and a gradual change in pressure in volume tank 140 and in bellows 128. This change in pressure in bellows 128 causes a force that tends to negate the force caused by the pressure in bellows 124; therefore, the pressure in bellows 124 has to keep changing to overcome this force from bellows 128. If the difference between the pressure in bellows 130 and in bellows 126 remains unchanged, the output pressure will keep changing in the same direction to overcome the change in force from bellows 128.

Therefore, as long as an error exists, the pressure in bellows 124, the output pressure, will keep changing due to this error; and the rate of change will be dependent upon the combination of restriction in needle valve 138 and volume in tank 140. This gives the controller a reset action, the rate of which is adjustable.

The gain of the controller is changed by pivoting fulcrum lever 122. Changing the position of fulcrum lever 122 changes the relative effect of the bellows' forces.

The action of thermal conductivity controller 60 can be explained by the following example. Consider that the set point pressure in bellows 130 and the voltage-to-pneumatic transducer 52 output pressure in bellows 126 are initially equal and also that the pressure in bellows 124 and the pressure in bellows 128 are equal so that the disc is in a condition of force balance. Now, if the conversion in the reactor 16 goes up, then the percentage of hydrocarbons in the gas from the flash tank 24 will go down with the result that the thermal conductivity will go down; and the output from the thermal conductivity analyzer 36 will decrease. The pressure in bellows 126 will, therefore, decrease; and the disc will become unbalanced with the nozzle 132 pressure being lower than it was in the condition of balance. The output from the pilot relay 134 will, therefore, decrease causing less force to be exerted by bellows 124 in order to bring the disc back in balance. This pressure in bellows 124 will slowly decrease due to the reset action of the combination of needle valve 138, volume tank 140, and bellows 128 as described above. This decrease will continue until the pressures in bellows 130 and bellows 126 equalize once more. The output from the thermal conductivity controller 60, which goes to the set point of the catalyst flow controller 84, will, therefore, have decreased due to the change in conversion with subsequent change in thermal conductivity of the flash gas. The amount of change that took place in the rate of the reset action is adjustable by adjusting the fulcrum lever 122 and the needle valve restrictor 138.

The pneumatic adding relay 68 used to add the pneumatic signal from the voltage-to-pneumatic transducer 64 and the pneumatic signal from the quality control computer 72 is similar to the thermal conductivity analyzer controller 60. It consists of a disc 142 which serves as a flapper; three bellows 144, 146, and 148; a spring 150; a fulcrum lever 152; a nozzle 154; and a pilot relay 156.

The flapper disc is supported from the bottom by bellows 144, 146, and 148; and the spring 150 exerts a predetermined force equivalent to a bellows with the same predetermined force applied to it. The disc is supported from the top by fulcrum lever 152 which pivots around the center near the disc. The disc pivots around the fulcrum points on the lever. The output from the pneumatic adding relay 68 and the pressure to bellows 148 is supplied by the pilot relay 156.

This device operates by maintaining a pressure in bellows 148 which keeps the disc in force balance. This is accomplished by keeping a constant pressure in nozzle 154 which is directed against the top of the disc. If the pressure in bellows 144 changes, the position of the flapper disc relative to the nozzle changes; and the pressure in the nozzle changes. This causes the pressure in bellows 148 to change, bringing the disc back in balance. The amount of pressure necessary to be added or substracted from bellows 148 for a given change in pressure in bellows 144 is determined by the position of the fulcrum lever 152. Clockwise rotation of the fulcrum lever 152 toward an imaginary line between bellows 148 and bellows 146 requires bellows 148 to have more pressure applied to it to offset a givn pressure applied to bellows 144.

Counterclockwise rotation of fulcrum lever 152 toward an imaginary line between bellows 144 and the spring 150 results in bellows 148 requiring less pressure to offset a given pressure applied to bellows 144. A change in pressure applied to bellows 146 also results in a change in pressure in bellows 148 for the same reason. This pressure change, however, results in an equal pressure change in bellows 148; because regardless of the fulcrum lever position, both bellows exert the same magnitude of torque upon the disc for the same pressure. A change in bellows 144 produces a proportional change in bellows 148 with the constant of proportionality dependent upon the position of fulcrum lever 152. A change in bellows 146 also produces a proportional change in bellows 148 with a proportionality constant being equal to 1. The output of the pneumatic adding relay 68 is, therefore, the sum of the input to bellows 144 multiplied by the proportionality constant determined by the fulcrum lever position and the input to bellows 146.

Figure 4:
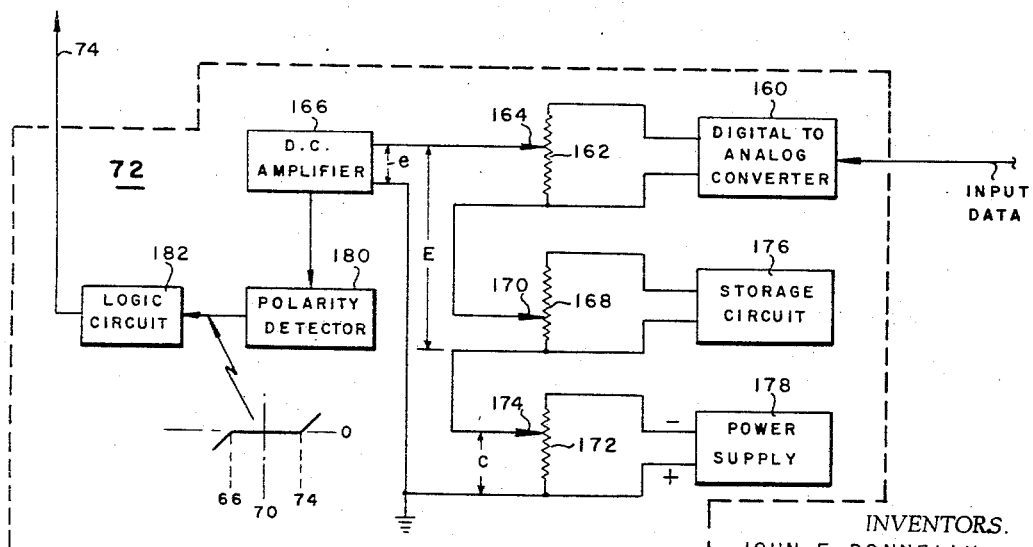
FIG. 4 is a schematic view, partly in block diagram, showing in more detail the operation of the quality control computer of FIG. 1.

A more detailed description of the quality control computer is shown in FIG. 4. The computing system continually computes a control value $\bar{X}_n$. When the control value $\bar{X}_n$ exceeds a predetermined value, a signal is applied through electrical line 74 to voltage-to-pneumatic transducer 76 which, in turn, applies a pneumatic signal to pneumatic adding relay 68.

The last piece of data fed into the computing system is given a higher weighting function than previous pieces of data. The control value $\bar{X}_n$ is indicated according to the formula:

$$\bar{X}_n = \frac{1^{X_n}}{k} + \frac{k - 1^{\bar{X}_{n-1}}}{k}$$

where:

$$X_n = \frac{M - T}{d}$$

$k$ = a weighing factor, and
$n$ = a time index.

In the formula $$X_n = \frac{M - T}{d}$$

M is the assigned value or measured quality, T is a preferred or target quality, and $d$ is a standard deviation including the laboratory and random plant fluctuations. Hence, a signal is fed from the quality control computer when the control value $\bar{X}_n$ is outside the range of $-1$ to $+1$.

The computer elements of the system include a digital-to-analog converter circuit 160. A potentiometer 162 is connected across the output of the digital-to-analog converter circuit 160. The tap 164 is set so that the portion of the power supply voltage which reaches the D.C. amplifier 166 is $1/k$ times the voltage across the potentiometer 162.

The above-described potentiometer is one of three potentiometers. The second potentiometer 168 is tapped by tap 170, and the third potentiometer 172 is tapped by tap 174.

Potentiometer 168 is connected across a storage circuit 176. The tap 170 is adjusted to multiply the output by the constant $$\frac{k-1}{k}$$

The tap 174 is set to apply a constant voltage $c$ equal in magnitude but opposite in polarity to the voltage E when the quality of the product has remained at the target quality T.

Other elements of the computing portion of the system include a power supply 178 feeding a voltage across the potentiometer 172, a polarity detector 180, and a logic circuit 182. Polarity detector 180 is a "dead zone" type polarity detector.

In operation, assume that it is desired to maintain a rubber quality having a Mooney value of 70. Assume further that if the value of $\overline{X}_n$ exceeds a value proportional to a standard deviation of 4, it is desired to adjust the rate of flow of the catalyst through line 20. In other words, the value of $\overline{X}_n$ must be maintained such that the value of $\overline{X}_n$ represents a Mooney viscosity value of the rubber between 66 and 74.

The control value $\overline{X}_n$ is compared with the value $c$ set into the computer manually. If the control value is within the limit, it is stored in storage circuit 176 (by circuits not shown in the figure). If, however, the control value exceeds the limit, then a signal is fed from logic circuit 182 through electrical line 74; and the control value is reset to zero and stored in storage circuit 176. A master timer (not shown) controls the time at which the value $c$ is compared with the voltage E. The net voltage E may be positive, negative, or zero.

The error voltage $e$ is the input to the D.C. amplifier 166. The output of this amplifier is fed to the polarity detection circuit 180 which, in turn, feeds to logic circuit 182.

The error voltage $e$ is used to actuate the polarity detection circuit 180 through the amplifier 166. If the control value is within the specified limit, then no action is taken. If, however, the control value is outside the limit, then the polarity detector 180 sends a signal to the logic circuit 182 which then sends a signal through line 74 to voltage-to-pneumatic transducer 76.

We claim:
1. A system for making butyl rubber comprising a reactor, a feedline connected to the reactor, a catalyst line connected to the reactor, a flash tank, a line interconnecting the reactor and the flash tank, a vaporized hydrocarbon line extending from the flash tank, a reactor temperature detector mounted within the reactor and adapted to produce an electrical signal representative of the temperature in the reactor, a catalyst flow rate controller in said catalyst line for controlling the flow of catalyst responsive to a pneumatic control signal, provided with the improvement comprising:
  a sample line connected to said vaporized hydrocarbon line;
  flow regulating means connected to said sample line for regulating the flow of fluid therethrough;
  measuring cell means including a temperature-variable resistor element connected to said flow regulating means for receiving fluid from said flow regulating means, said variable resistor element being variable in electrical resistance as a function of the thermal conductivity of the fluid passing therethrough;
  Wheatstone bridge means including said temperature-variable resistor element in one leg thereof;
  a servo-controlled Wheatstone bridge unbalance measuring circuit connected to the output of said Wheatstone bridge for producing an output signal proportional to unbalance in said Wheatstone bridge and produced by variations in said variable resistor element;
  first voltage-to-pneumatic signal transducer means connected to said unbalance measuring circuit for producing a variable pneumatic control signal responsive to variations in said output signal from said unbalance measuring circuit;
  a second voltage-to-pneumatic signal transducer means for producing a variable pneumatic signal responsive to variations in the output signal of said temperature detector;
  pneumatic control means connected to said first transducer means, to said second transducer means, and to said catalyst flow rate controller for producing a pneumatic control signal for controlling said catalyst flow rate controller, said pneumatic control signal being variable responsive to variations in the output signals of said first and second transducer means;
  a pneumatic adding relay connected between said pneumatic control means and said second voltage-to-pneumatic signal transducer means;
  second control means including a third voltage-to-pneumatic signal transducer means connected to said adding relay for producing a pneumatic output signal indicative of a manually adjustable control variable;
  said manually adjustable control variable being the viscosity of said butyl rubber; and
  said pneumatic adding relay being adapted to produce an output signal to said pneumatic control means indicative of the sum of the output signals of said second control means and said second voltage-to-pneumatic signal transducer means.

References Cited

UNITED STATES PATENTS

| | | | |
|---|---|---|---|
| 2,833,750 | 5/1958 | Vickers | 260—95 |
| 2,908,734 | 10/1959 | Cottle | 260—94.9 |
| 3,130,187 | 4/1964 | Tolin et al. | 260—94.9 |
| 3,256,262 | 6/1966 | Irvin | 260—85.3 |
| 2,762,568 | 9/1956 | Sullivan | 23—255 |
| 3,026,184 | 3/1962 | Karasek | 23—255 |

MORRIS O. WOLK, *Primary Examiner.*

R. E. SERWIN, *Assistant Examiner.*

U.S. Cl. X.R.

23—230, 253; 260—85.3